Oct. 12, 1954
H. G. KELLOGG
2,691,204
APPARATUS FOR PRODUCING METAL PARTS
Filed July 12, 1948
13 Sheets-Sheet 1
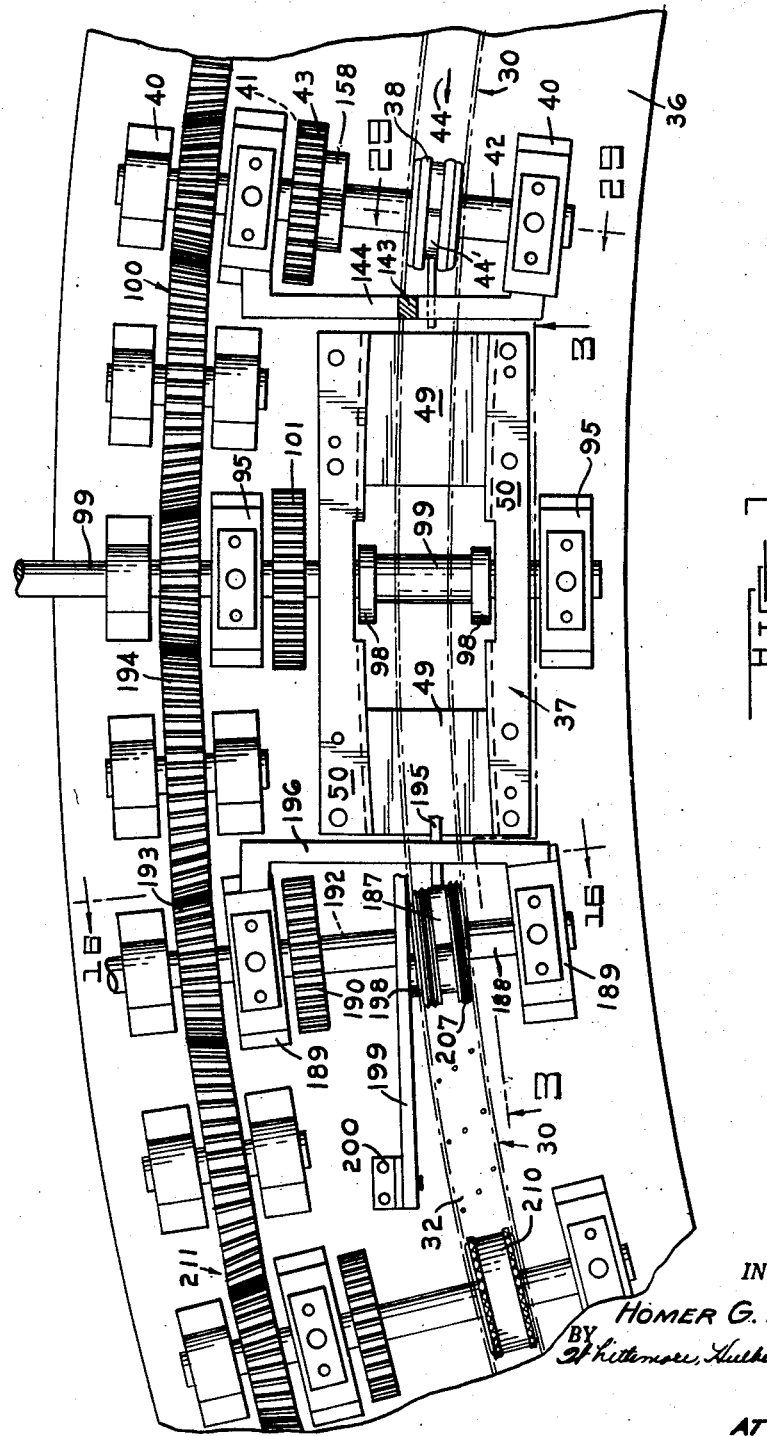
INVENTOR.
HOMER G. KELLOGG
BY
ATTORNEYS Oct. 12, 1954  H. G. KELLOGG  2,691,204
APPARATUS FOR PRODUCING METAL PARTS
Filed July 12, 1948                               13 Sheets-Sheet 2
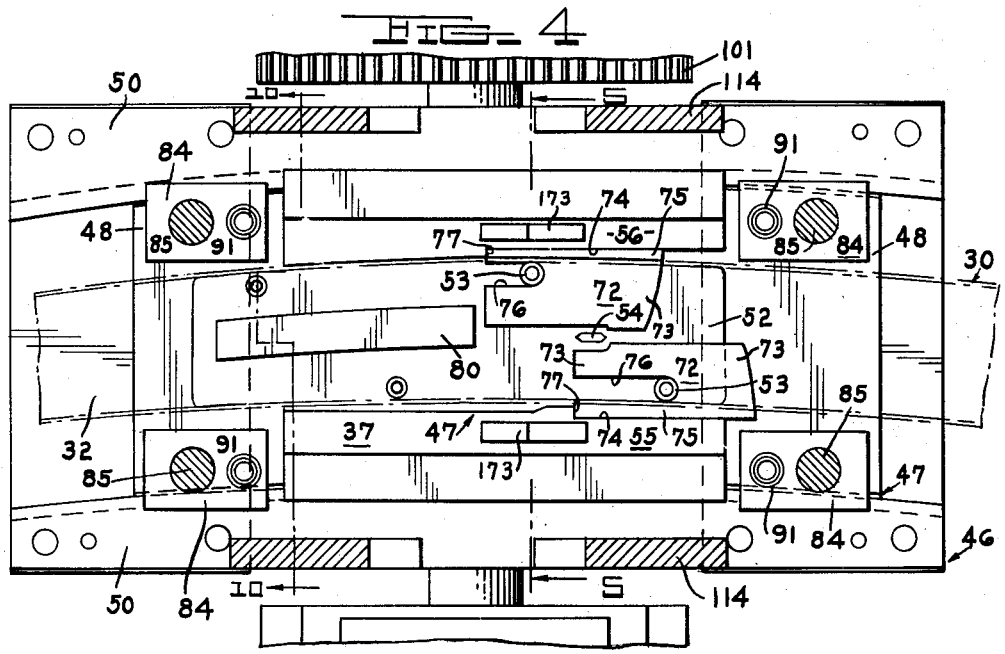
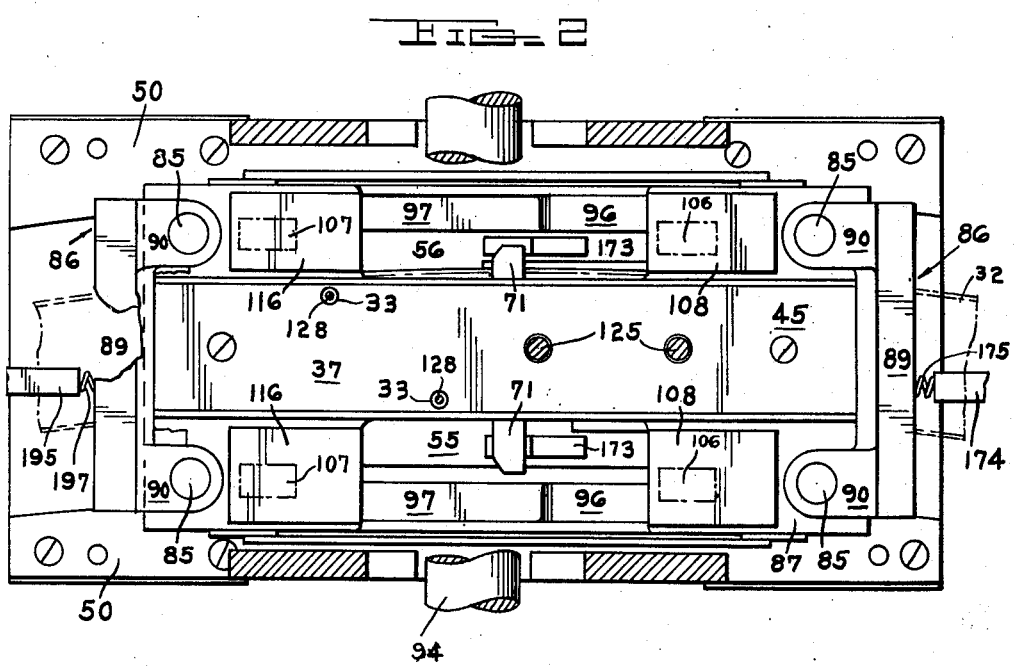
INVENTOR.
HOMER G. KELLOGG
BY
ATTORNEYS Oct. 12, 1954      H. G. KELLOGG      2,691,204
APPARATUS FOR PRODUCING METAL PARTS
Filed July 12, 1948      13 Sheets-Sheet 3
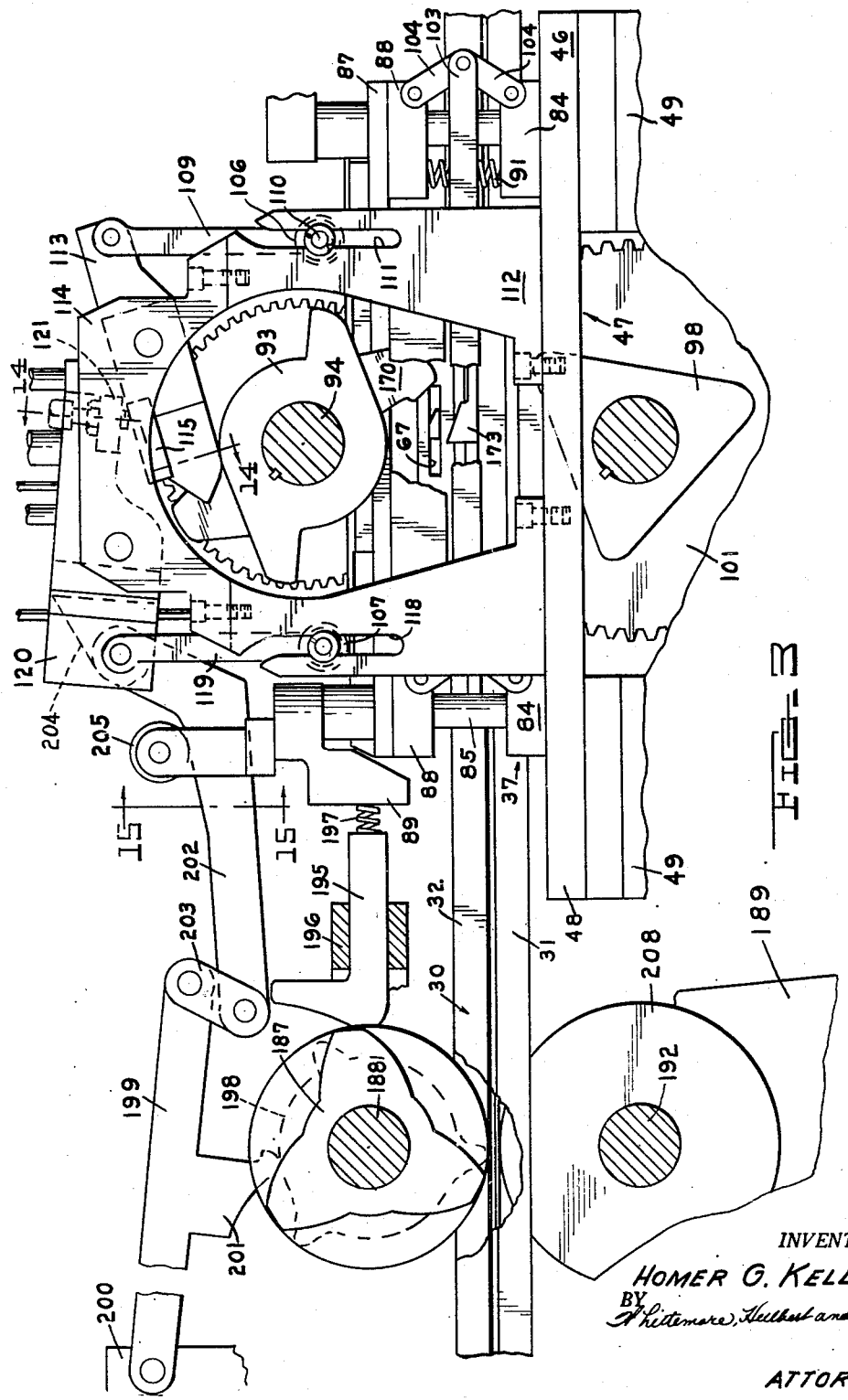
INVENTOR.
HOMER G. KELLOGG
BY
ATTORNEYS Oct. 12, 1954 H. G. KELLOGG 2,691,204
APPARATUS FOR PRODUCING METAL PARTS
Filed July 12, 1948 13 Sheets-Sheet 4
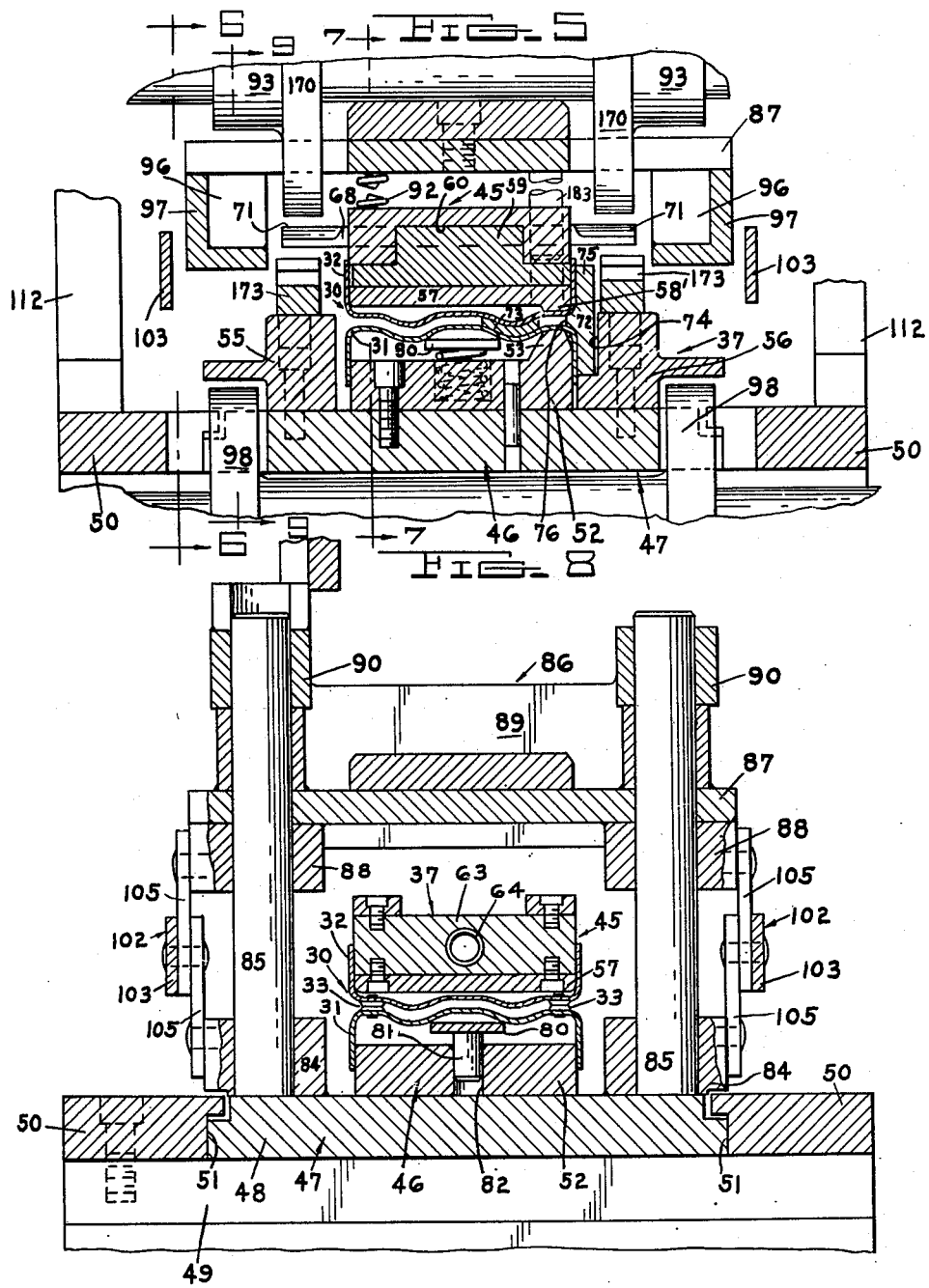
INVENTOR.
HOMER G. KELLOGG
BY
ATTORNEYS

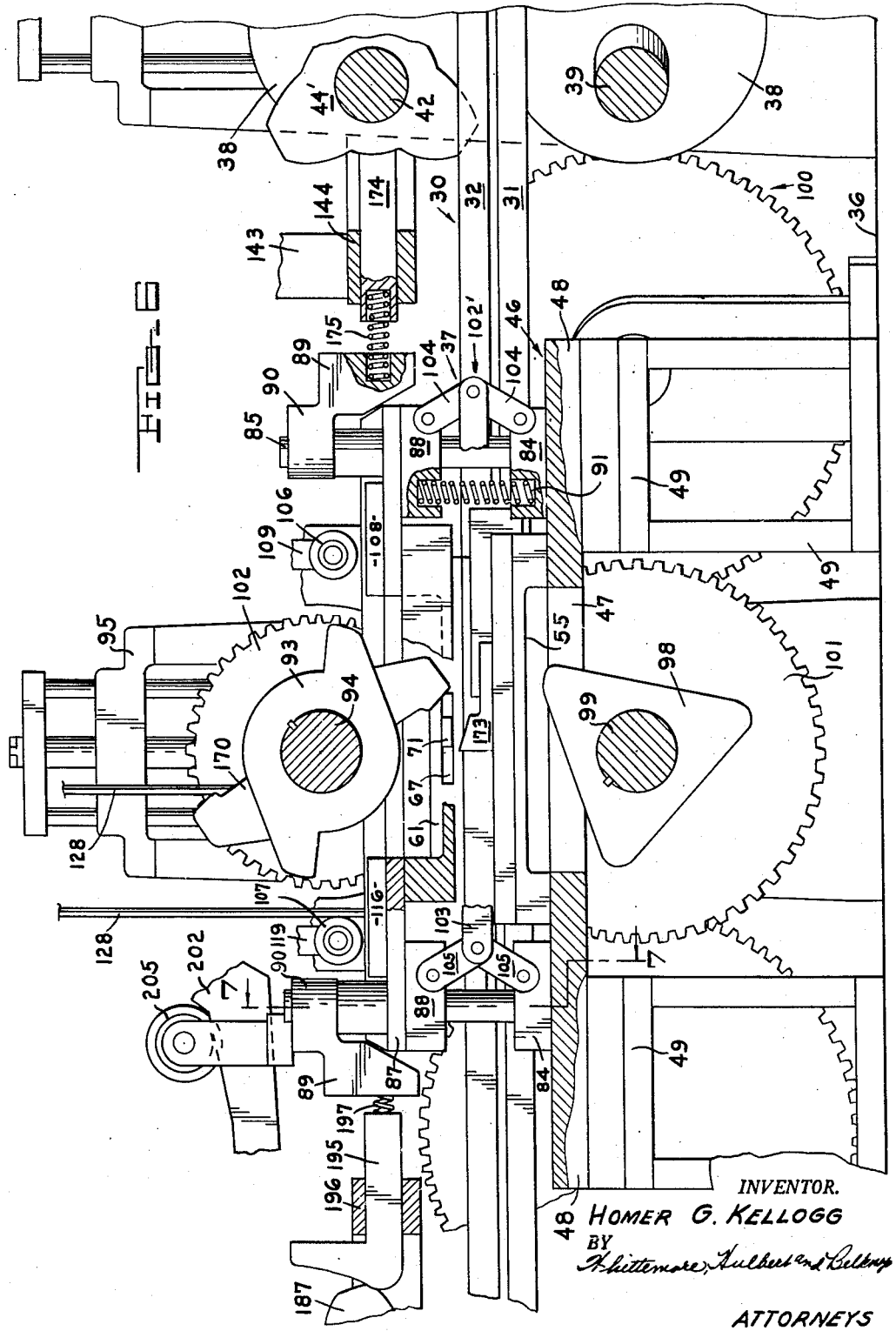

Oct. 12, 1954        H. G. KELLOGG        2,691,204
APPARATUS FOR PRODUCING METAL PARTS
Filed July 12, 1948        13 Sheets-Sheet 6
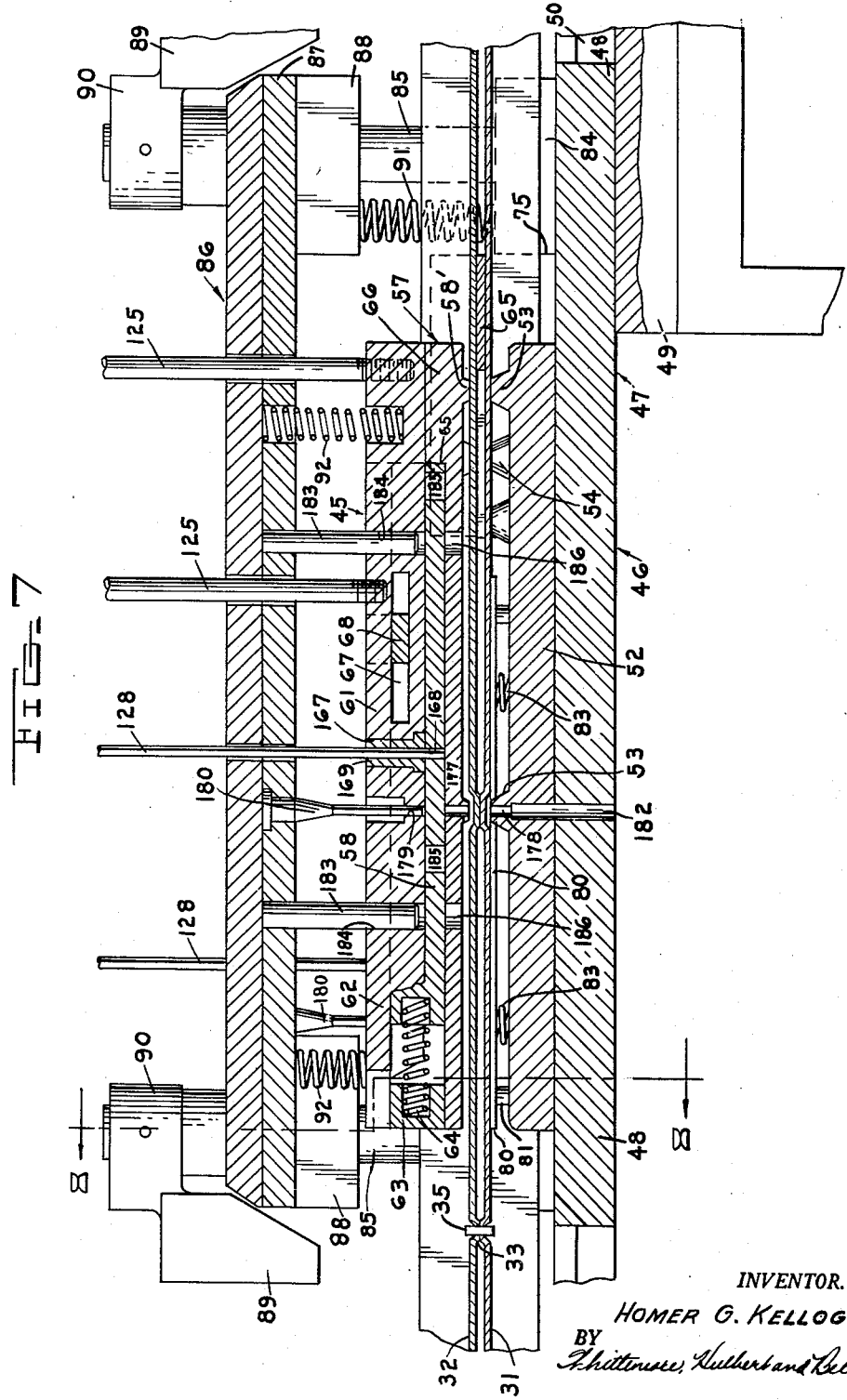
INVENTOR.
HOMER G. KELLOGG
BY
ATTORNEYS Oct. 12, 1954  H. G. KELLOGG  2,691,204
APPARATUS FOR PRODUCING METAL PARTS
Filed July 12, 1948  13 Sheets-Sheet 7
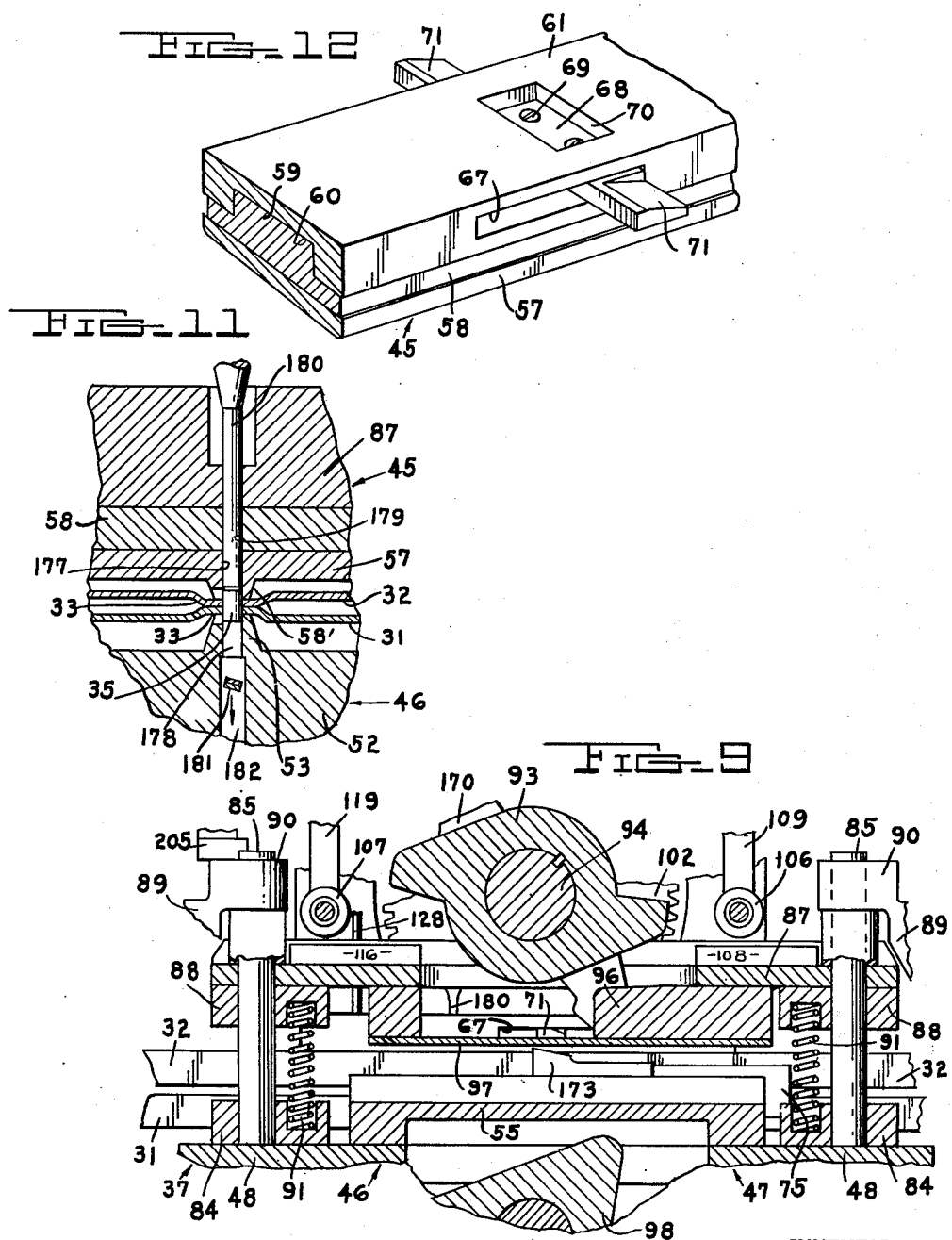
INVENTOR.
HOMER G. KELLOGG
BY
ATTORNEYS Oct. 12, 1954  H. G. KELLOGG  2,691,204
APPARATUS FOR PRODUCING METAL PARTS
Filed July 12, 1948  13 Sheets-Sheet 8
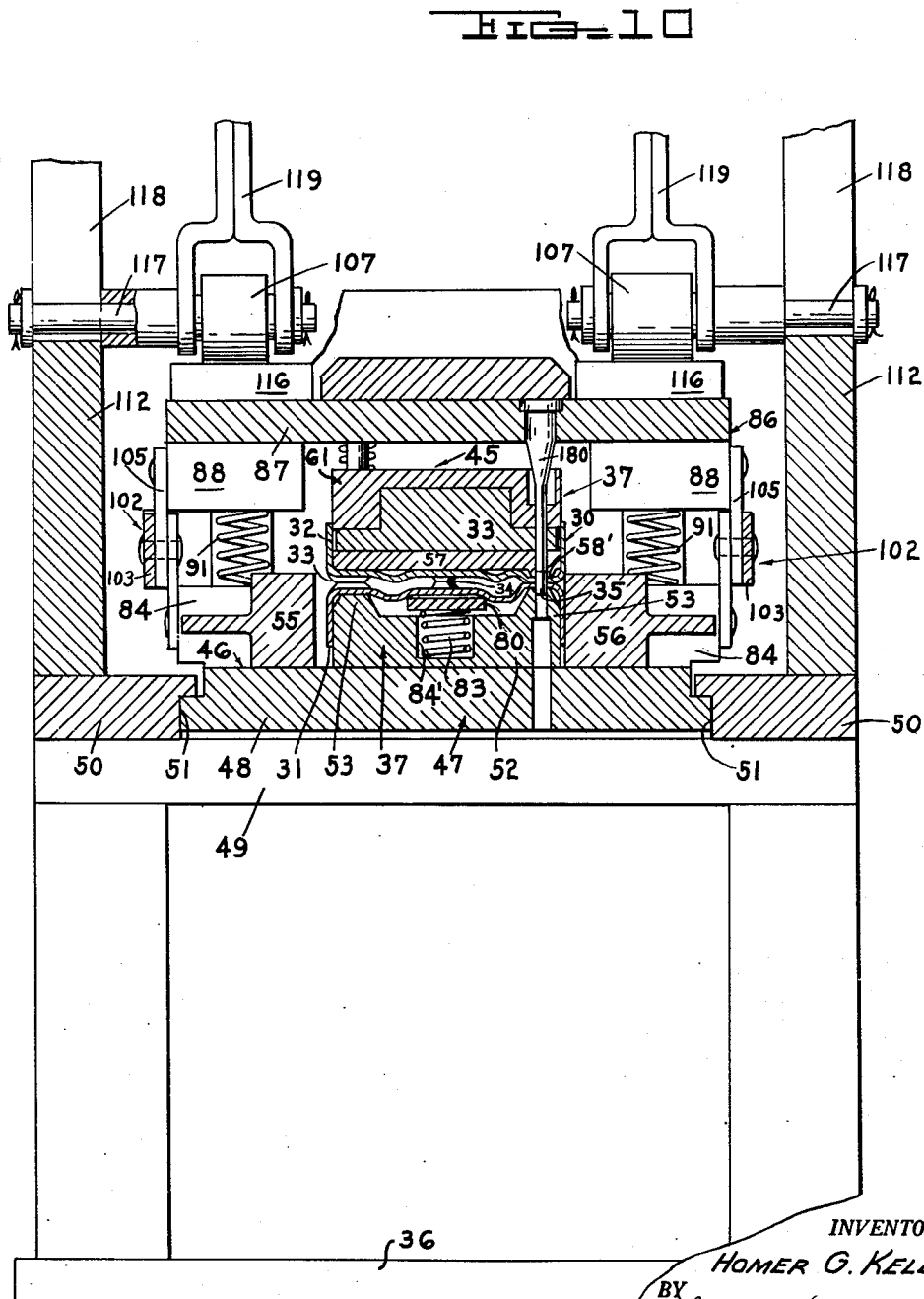
INVENTOR.
HOMER G. KELLOGG
BY
ATTORNEYS

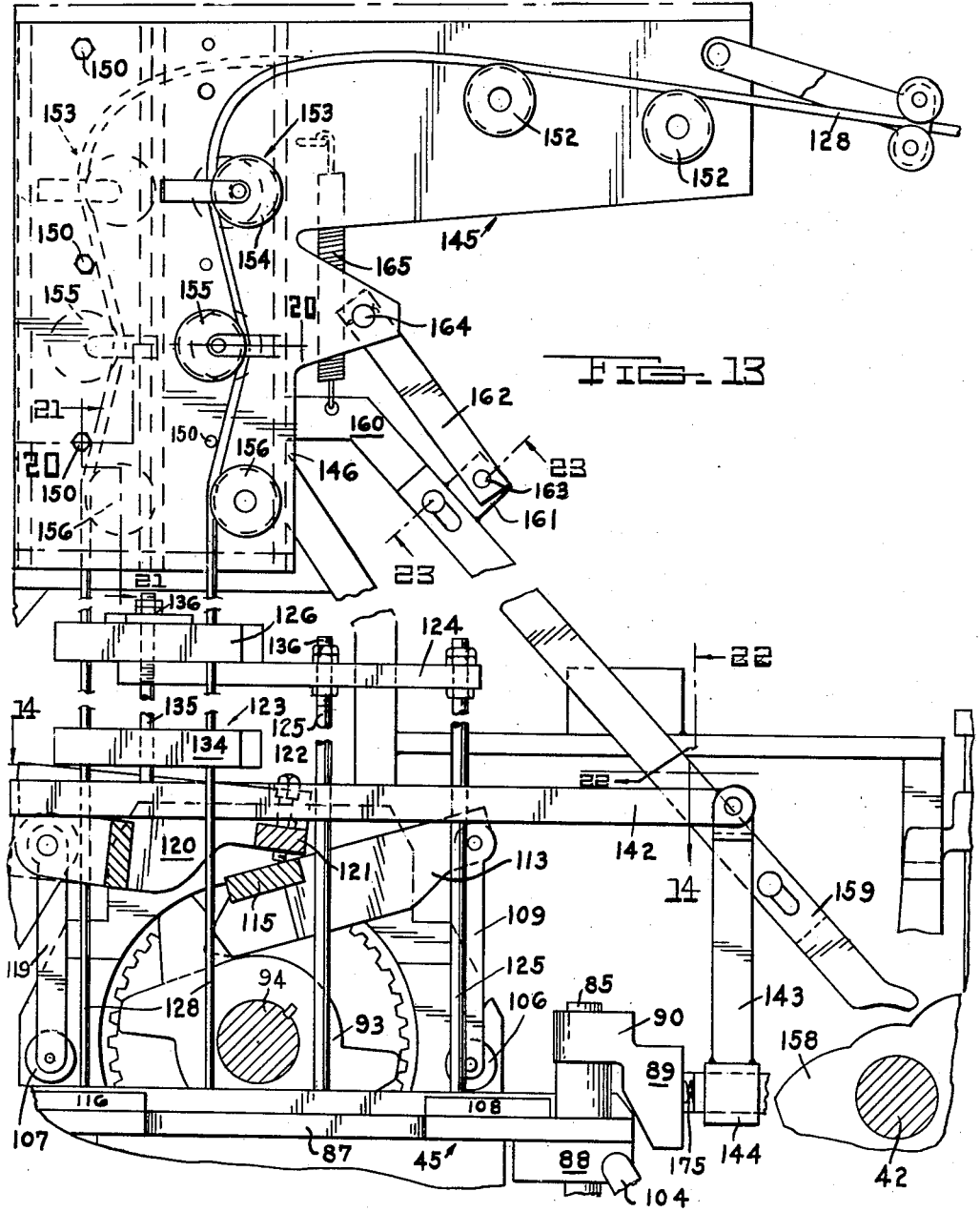

Oct. 12, 1954
H. G. KELLOGG
2,691,204
APPARATUS FOR PRODUCING METAL PARTS
Filed July 12, 1948
13 Sheets-Sheet 10
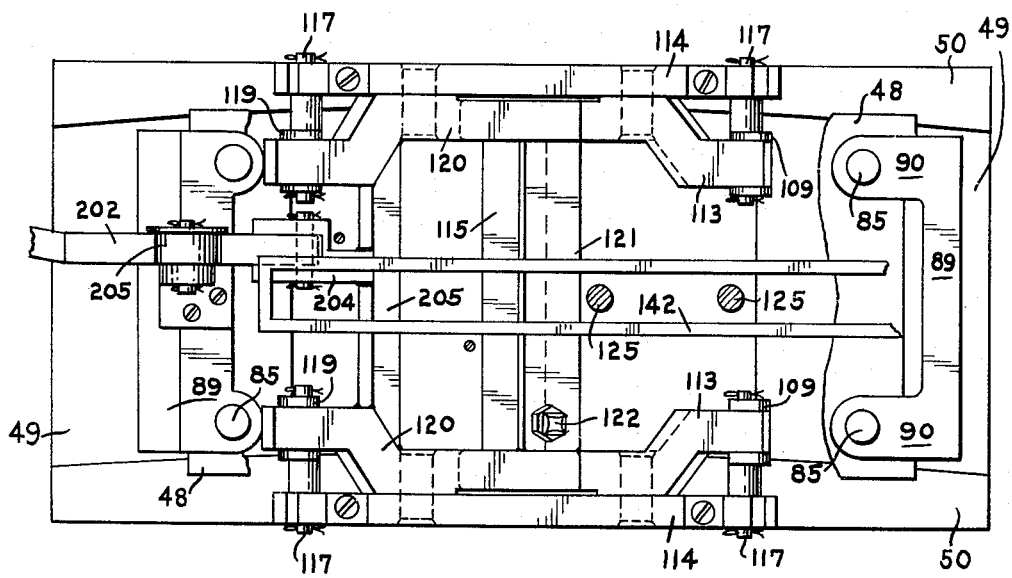
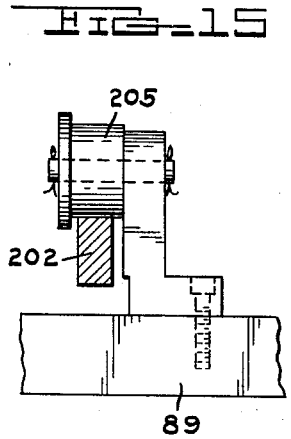
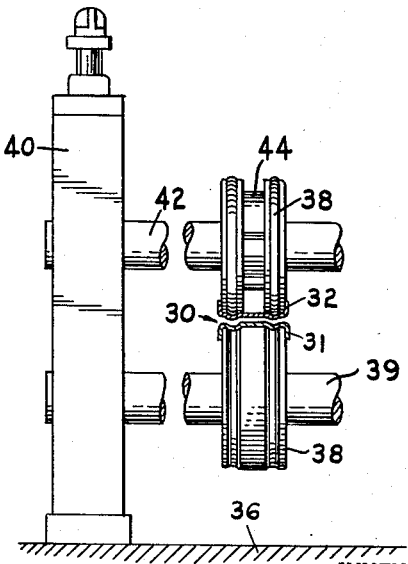
INVENTOR.
HOMER G. KELLOGG
BY
Whittemore, Hulbert and Belknap
ATTORNEYS Oct. 12, 1954 H. G. KELLOGG 2,691,204
APPARATUS FOR PRODUCING METAL PARTS
Filed July 12, 1948 13 Sheets-Sheet 11
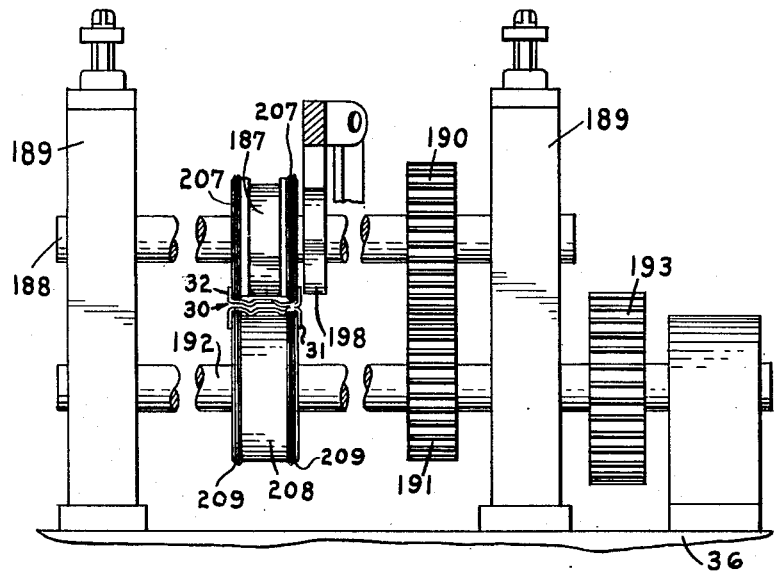
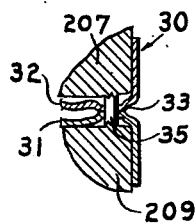
INVENTOR.
HOMER G. KELLOGG
BY
ATTORNEYS Oct. 12, 1954  H. G. KELLOGG  2,691,204
APPARATUS FOR PRODUCING METAL PARTS
Filed July 12, 1948  13 Sheets-Sheet 12
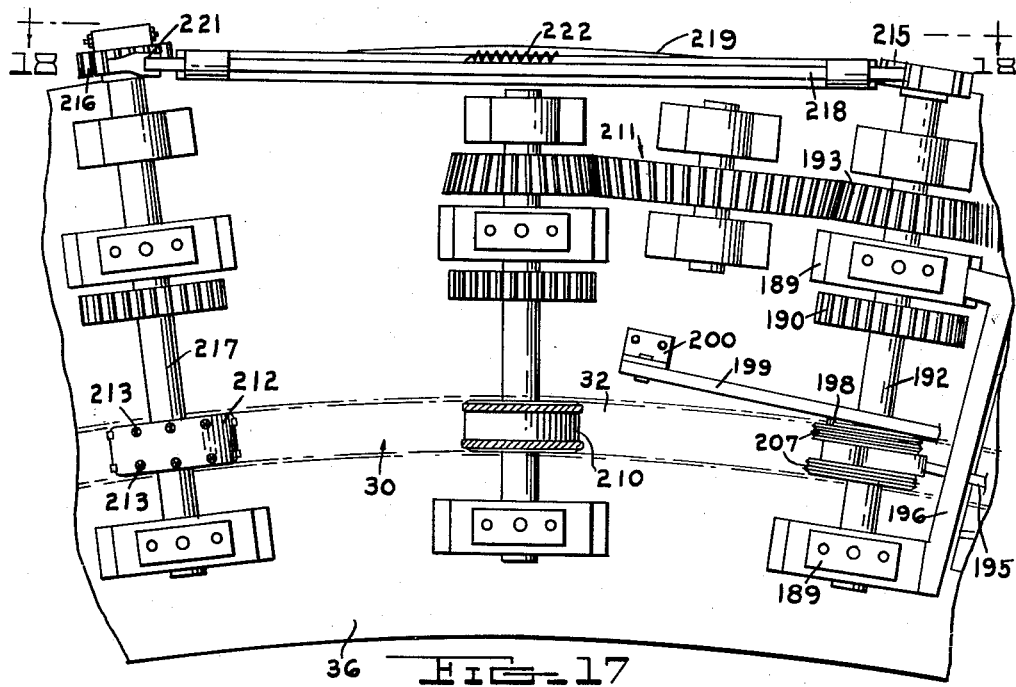
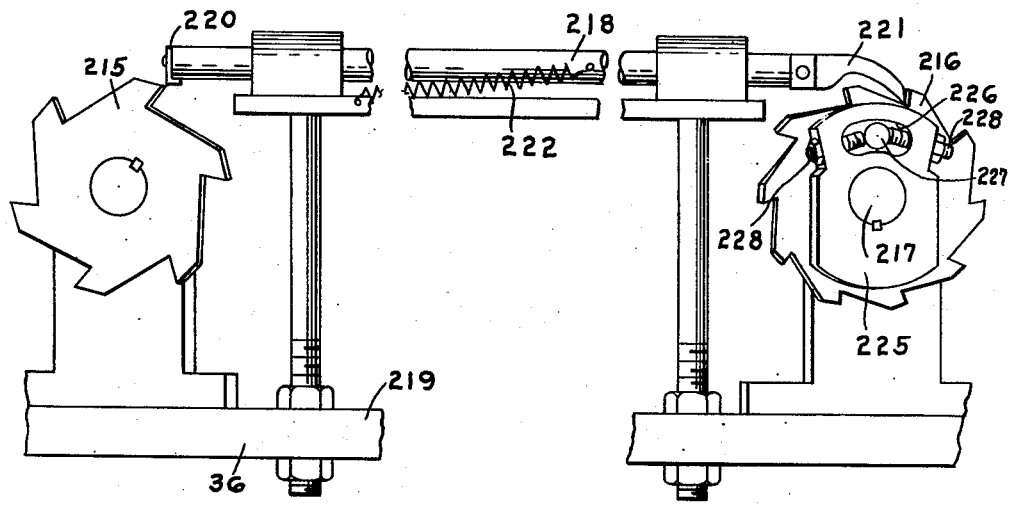
INVENTOR.
HOMER G. KELLOGG
BY
ATTORNEYS Oct. 12, 1954 H. G. KELLOGG 2,691,204
APPARATUS FOR PRODUCING METAL PARTS
Filed July 12, 1948 13 Sheets-Sheet 13
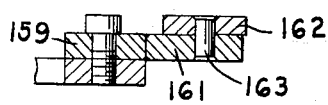
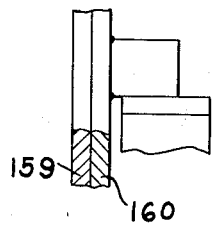
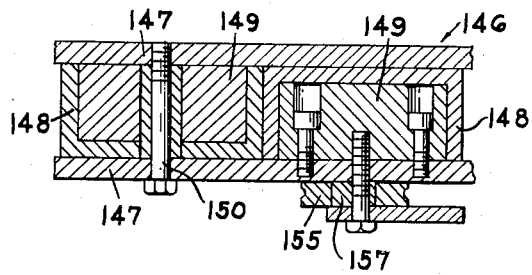
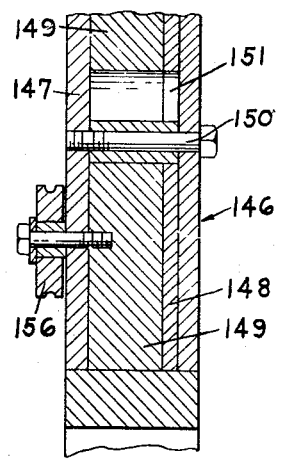
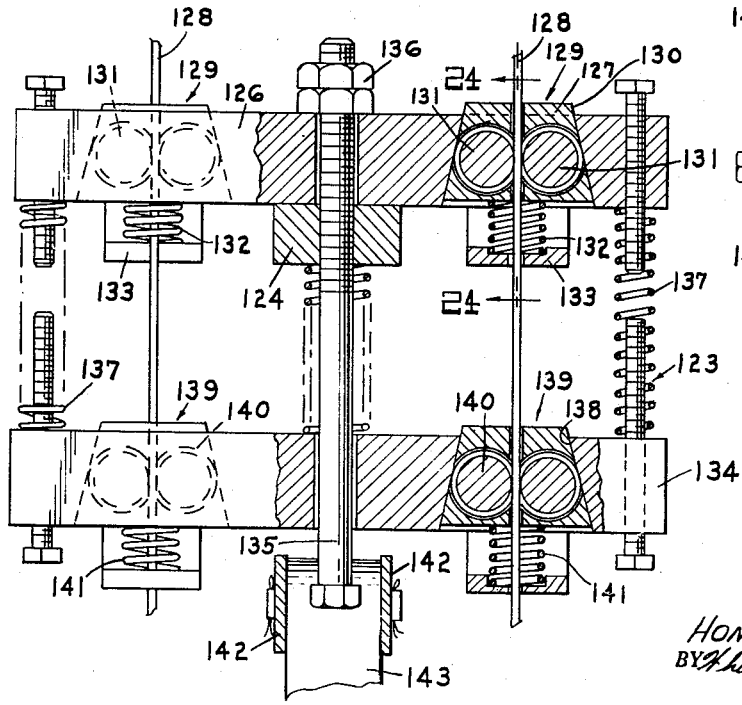
INVENTOR.
HOMER G. KELLOGG
ATTORNEYS Patented Oct. 12, 1954

2,691,204

UNITED STATES PATENT OFFICE 2,691,204

APPARATUS FOR PRODUCING METAL PARTS

Homer G. Kellogg, Highland Park, Mich., assignor to Motor Products Corporation, Detroit, Mich., a corporation of New York Application July 12, 1948, Serial No. 38,277

15 Claims. (Cl. 29—34)

This invention relates generally to apparatus for manufacturing structural members composed of metal strips permanently secured together and has particular reference to improvements in apparatus for securing the strips together. This is a continuation-in-part of my copending application, Ser. No. 710,525, filed November 18, 1946, and now Patent No. 2,473,590.

Although the invention is not limited to the fabrication of structural elements of any particular shape or size, nevertheless, it does provide highly satisfactory equipment for producing structural elements of the type commonly referred to in the trade as metal nailing members. These members usually comprise a pair of strips channel-shaped in cross section and permanently secured together in back to back relationship with the base portions spaced laterally from one another to receive a nail therebetween. The base portions are ordinarily irregular in cross sectional contour to impart a serpentine shape to the space therebetween so that as a nail is forced into this space, it is crimped and securely held against accidental withdrawal.

In the interests of economy in manufacture, the strips are preferably secured together adjacent opposite longitudinal edges thereof by pins which are forced through the strips and have the opposite ends peened or riveted over the adjacent strips. It has been proposed to successively accomplish the above securing function at regular spaced intervals without interrupting advancement of the strip along a predetermined path of travel, and as a consequence, this apparatus may be used in conjunction with the rolling machine employed to fashion the strips to the specified cross sectional contour. It has also been proposed to fashion the pins by cutting the same from substantially continuous lengths of wire stock prior to forcing the pins through the strips and peening the ends of the pins.

With the above in view, it is one of the objects of this invention to provide apparatus of the foregoing type equipped with mechanism for straightening the wire stock before the latter is fed to the cut-off die. Thus any tendency for the cut-off die to become jammed by irregular stock is eliminated and continued reliable operation of the apparatus is assured.

Another object of this invention is to space the two strips from one another as they are advanced between cooperating die sections having provision for embossing the strips in directions toward one another at points spaced longitudinally of the strips and movable as a unit with the strips during the embossing operation. The embossed portions cooperate to hold the strips in sufficient lateral spaced relationship throughout their length to enable driving a nail between the strips at practically any selected point.

Still another object of this invention is to support the spacers on the movable die sections so that the spacers move as a unit with the die sections. This arrangement reduces wear of the spacers to a minimum since during the interval the strips are clamped between the die sections in pressure contact with the spacers, the latter are moving with the strips. Thus the only time the strips move relative to the spacers is during the open positions of the die sections when the friction is at a minimum.

A further feature of this invention is to provide riveting rolls at opposite sides of the strips beyond the delivery end of the die and to provide means for indexing the rolls to peen the projecting ends of the pins over the adjacent strip.

The foregoing as well as other objects will be made more apparent as this description proceeds, especially when considered in connection with the accompanying drawings, wherein:

Figure 1 is a fragmentary plan view of apparatus embodying the features of this invention;

Figure 2 is a plan view partly in section of the die assembly embodied in the apparatus;

Figure 3 is a sectional view taken on the line 3—3 of Figure 1;

Figure 4 is a plan view partly in section of the die assembly showing the top die section removed for the sake of clearness;

Figure 5 is a cross sectional view taken on the line 5—5 of Figure 4;

Figure 6 is a sectional view taken on the line 6—6 of Figure 5;

Figure 7 is a sectional view taken on the line 7—7 of Figure 5;

Figure 8 is a sectional view taken on the line 8—8 of Figure 7;

Figure 9 is a sectional view taken on the line 9—9 of Figure 5;

Figure 10 is a sectional view taken on the line 10—10 of Figure 4;

Figure 11 is an enlarged sectional view of a part of the die assembly and showing the punch for driving one of the pins through the strips of the structural member;

Figure 12 is a fragmentary perspective view of a part of the die assembly;

Figure 13 is a fragmentary end elevational view of a part of the apparatus showing the straightening mechanism for the lengths of pin stock;

Figure 14 is a sectional view taken on the line 14—14 of Figure 13;

Figure 15 is a sectional view taken on the line 15—15 of Figure 3;

Figure 16 is a sectional view taken on the line 16—16 of Figure 1;

Figure 17 is a semi-diagrammatic plan view of a part of the apparatus showing the indexing mechanism for the riveting rolls;

Figure 18 is a side elevational view of the indexing mechanism shown in Figure 17;

Figure 19 is a detailed sectional view of the feeding mechanism for the pin stock;

Figures 20, 21, 22 and 23 are respectively sectional views taken on the lines 20—20, 21—21, 22—22 and 23—23 of Figure 13;

Figure 24 is a sectional view taken on the line 24—24 of Figure 19;

Figures 25, 26, 27 and 28 are fragmentary sectional views of the rolls provided for peening and riveting opposite ends of the pins over adjacent surfaces of the strips; and Figure 29 is a sectional view taken on the line 29—29 of Figure 1.

It will be understood as this description proceeds that apparatus embodying the principles of this invention may be advantageously employed to form numerous different types of composite members. However, the apparatus selected herein for the purpose of illustration is especially designed to produce a structural member or element 30 comprising elongated strips 31 and 32 arranged in juxtaposition to one another.

As shown particularly in Figures 5 and 8 of the drawings the strips are substantially channel-shaped in cross section and are positioned with the base portions thereof in back to back relationship. In the present instance the base portions of the two strips are spaced laterally from one another a distance sufficient to enable driving nails therebetween and are of an irregular cross sectional contour to provide a serpentine passage. The arrangement is such that nails driven into the passage between the strips are crimped and are retained in place.

Referring now more in detail to Figures 7 and 11, it will be noted that the base portions of the two channel-shaped strips are embossed toward one another at points spaced longitudinally of the structural element 30 adjacent opposite sides thereof. The embossed portions are indicated generally by the reference numeral 33, and act as spacers for holding the base portions of the strips in proper laterally spaced relationship. In practice the embossed portions 33 at one longitudinal side edge of the structural member 30 are offset lengthwise of the structural member with respect to the embossed portions 33 at the opposite longitudinal side edge. In cases where the structural member is of substantial width, it may also be desired to emboss the central portions of the base sections of the channel-shaped strips in the manner designated by the numeral 34 in Figure 10 of the drawings.

In any case the two channel-shaped strips are riveted together at each of the embossed portions 33 by a pin 35 projecting through the embossed portions 33 and having the opposite ends peened or riveted over the adjacent strips in the manner indicated more clearly in Figure 28 of the drawings.

The structural member described above may be manufactured in substantially continuous lengths and may also be formed with a predetermined degree of curvature depending upon the use of the structural member. In any case the two channel-shaped strips are advanced as a unit along a predetermined path of travel during the riveting and embossing operations. Thus it is not necessary to interrupt advancement of the strips during either the embossing or riveting operations, and as a consequence, the apparatus forming the subject matter of this invention may be used in conjunction with the rolling machine employed for forming the strips to the cross sectional contour described above.

With the foregoing in view, reference is now made more in detail to the apparatus for embossing and riveting the two channel-shaped strips together. This apparatus comprises a frame structure indicated generally by the reference character 36 and is adapted to support a die assembly 37 with parts thereof positioned above and below the path of travel of the two channel-shaped strips. Upon reference to Figure 29 of the drawings, it will be noted that a pair of feed rolls 38 are rotatably supported on the frame 36 at the entrant end of the die assembly 37 in positions to respectively frictionally engage the base portions of the channel-shaped strips 31 and 32. The bottom feed roll is secured to a shaft 39 having the opposite ends journalled in bearings 40 on the frame 36 and having a drive gear 41 secured thereto. The top feed roll 38 is secured to a shaft 42 having the opposite ends journalled in bearings on the frame 36 and having a gear 43 secured thereto in meshing relation with the gear 41. The arrangement is such that the feed rolls are rotated in opposite directions to advance the channel-shaped strips in the direction of the arrow 44 shown in Figure 1 of the drawings. Attention may be called to the fact that the top feed roll 38 is formed of two axially spaced sections, and that a cam 44' is secured to the shaft 42 between the feed roll sections for rotation by the shaft. This cam is shown in Figures 1 and 6 of the drawings, and is instrumental in advancing the die section 37 in the direction of movement of the channel-shaped strips during the embossing and riveting operations.

The die assembly 37 comprises a top section 45 positioned above the structural element 30 and a bottom section 46 located below the structural element. The bottom section 46 embodies a slide 47 substantially I-shaped in plan view having heads 48 at opposite ends extending laterally beyond opposite sides of the path of travel of the strips 31, 32 and supported for sliding movement in the direction of advancement of the strips on parts 49 of the frame, shown in Figures 6, 8 and 10 of the drawings.

The slide 47 is guided by a pair of guides 50 respectively secured to the frame parts 49 at opposite sides of the slide and having recesses 51 formed in the inner edges for receiving the adjacent edges of the slide 47. It will be noted from Figures 8 and 10 that the width of the recesses 51 is sufficiently greater than the width of the edge portions of the slide 47 received therein to enable movement of the lower die section 47 upwardly the distance required to form the embossed portions 33 and 34 in the bottom strip 31. Secured to the top of the slide 47 is a part 52 elongated in the direction of length of the slide and having a width predetermined to enable projecting the same into the channel of the bottom strip 31. As shown in Figures 5, 7, 10 and 11, the part 52 is formed with upwardly extending projections 53 at opposite side edges spaced from each other to fashion the embossed portions 33 in the bottom strip 31 in response to upward movement of the bottom die section 46. The center row of bosses 34 are formed on the bottom strip 31 by projections 54 extending upwardly from the part 52 and shown in Figure 7 of the drawings.

Inasmuch as the structural element 30 is longitudinally curved, it will be understood that the two die sections 45 and 46 are correspondingly curved, and this is also true of the guides 50 so that the die assembly 31 is compelled to move along the same path as the structural element. The bottom die section 46 also embodies a pair of rails 55 and 56 secured to the slide 47 at opposite sides of the part 52, as shown in Figures 4, 5 and 10. The rail 56 is positioned to engage the adjacent side of the bottom strip 31 and acts as a shoe to position this strip on the lower die section.

The top die section 45 is adapted to extend into the channel of the top strip 32 and has a bottom plate 57 engageable with the base of the channel-shaped strip 32. As shown in Figures 5, 10 and 11 the plate 57 has downwardly extending projections 58' registering with the projections 53 to form the embossed portions 33 in the top strip 32 in response to downward movement of the die sections. Additional projections are formed on the plate 57 at the center thereof for registration with the projections 54 to form the row of embossed portions 34 on the top strip 32. Supported on the top of the plate 57 for sliding movement relative thereto is a slide 58 having a longitudinally extending central rib 59 projecting upwardly therefrom and received within a recess 60 formed in the bottom side of a top member 61 in the manner clearly shown in Figure 12 of the drawings. Referring now to Figure 7 of the drawings a portion 62 at the rear end of the member projects beyond the adjacent end of the slide and is secured to the plate 57 by a spacer block 63. A coil spring 64 is supported between the block 63 and the rear end of the slide for urging the slide to its forwardmost position wherein the front end of the slide 58 abuts a shoulder 65 formed by an upstanding enlargement 66 at the front end of the plate 57. This enlargement forms a seat for the front end of the member 61 and is secured thereto by suitable studs, not shown.

Referring again to Figure 12 of the drawings it will be noted that an elongated slot 67 is formed in opposite side walls of the member 61 intermediate the ends of the latter for receiving a cross piece 68. The central portion of the cross piece is secured to the slide 58 by screws 69 accessible through an opening 70 through the top wall of the member 61. The free ends of the cross piece 68 project laterally beyond opposite sides of the member 61 and are fashioned to form cam portions 71. As will be presently set forth the slide 58 is moved in a direction against the action of the spring 64 by applying a rearward thrust against the cam portions 71 on the cross piece 68.

Forming a part of the die assembly 37 is a pair of spacers 72 shown in Figures 4 and 5 of the drawings as positioned at opposite sides of the structural element 30. The spacers are generally T-shaped in cross section and are respectively supported on the rails 55, 56 with the stem portions 73 extending horizontally in an inward direction between the cooperating die sections. It will be noted particularly from Figure 5 of the drawings that the rails are formed with recesses 74 in the inner faces thereof for slidably receiving the lower ends of the head portions 75 of the spacers. The stem portions 73 are located to extend between the two strips 31, 32 of the structural element 30 as the latter is fed between the die sections. The thickness of the stem portions 73 corresponds to the specified spacing between the strips 31, 32 and are shaped to correspond to the cross sectional contour of the portions of the strips engaged thereby. It will also be noted that the stem portions 73 are formed with slots 76 which extend forwardly from the rear ends of the spacers and provide clearance for the embossing projections 53 and 58' respectively carried by the top and bottom die sections. As shown particularly in Figure 4 of the drawings, the rear ends of the heads 75 on the spacers are adapted to abut shoulders 77 formed by the rear ends of the recesses 74. The spacers are normally held against the shoulders 77 by reason of the frictional engagement between the strips 31, 32 and the stem portions 73 of the spacers. Referring again to Figure 5 of the drawings, it will be noted that the head portions 75 of the spacers respectively frictionally engage the flanges at opposite sides of the structural element 30 and resist any tendency for these flanges to deform during the embossing operation. The foregoing construction is such that when the cooperating die sections are moved into clamping engagement with the structural element 30, the spacers 72 move as a unit with the die 37 along the path of travel of the structural element, so that during the interval maximum pressure is applied to the spacers, there is no relative movement between the structural element and spacers. This is highly advantageous in that it reduces the wear of the spacers to a minimum.

In some instances it may be desirable to provide a support for the central portion of the structural element 30 while the latter is located between the cooperating die sections. With this in view reference is made to Figures 5, 7, 8 and 10, wherein it will be noted that a pressure pad 80 is supported on the lower die section 46 in a position to engage the central portion of the bottom strip 31. The pressure pad 80 is in the form of an elongated strip which extends rearwardly from the spacers 72 to approximately the rear end of the die assembly. This pressure pad is supported for vertical sliding movement at spaced points on the part 52 of the bottom die sections 46 by pins 81 having the upper ends secured to the pressure pad and having the lower ends slidable in bores 82 formed in the part 52. The pressure pad is yieldably urged at longitudinally spaced points in an upward direction into engagement with the strip 31 by coil springs 83 located within the recesses 84 also formed in the part 52 of the lower die section.

Upon reference to Figures 4 and 8 of the drawings, it will be noted that blocks 84 are respectively secured to the slide 47 at each of the corners thereof. Each block 84 is bored and has a pressed fit with the lower end of a vertically extending guide pin 85. The upper ends of the guide pins project substantially above the die assembly 30 and a header assembly 86 is slidably supported on the guide pins. The header assembly 86 comprises a plate 87 approximating in size the slide 47 and having blocks 88 respectively secured to the underside at the four corners thereof. The blocks 88 and plate 87 are formed with aligned openings therethrough for slidably receiving the pins 85. As shown particularly in Figure 2 of the drawings, a bridge 89 extends transversely of the plate 87 at each end thereof. The bridges 89 are provided with laterally inwardly extending ears 90 at opposite ends and the ears are respectively slidably supported on the adjacent guide pins 85.

The header assembly 86 is normally yieldably maintained in its raised position by means of four coil springs 91 respectively located between the pads 89 on the plate 87 and the pads 84 on the slide 47 as clearly shown in Figures 4, 6 and 9 of the drawings. It will also be noted from Figure 7 of the drawings that the plate 87 is, in effect, connected to the top die section 45 by coil springs 92 located between the top die section 45 adjacent opposite ends of the latter and the plate 87. The purpose of the coil springs 92 is to urge the top die section 45 downwardly in response to downward movement of the header assembly 86.

The header assembly 86 is moved downwardly to effect a corresponding movement of the top die section 45 by a pair of cams 93 respectively supported at opposite sides of the plate 87 above the latter on a drive shaft 94. As shown in Figure 1 of the drawings, the drive shaft 94 is journalled in bearings 95 suitably supported on the machine frame 36, and is driven in a manner to be more fully hereinafter described. Upon reference to Figure 5 of the drawings it will be noted that the plate 87 is formed with recesses in opposite sides thereof to provide clearance for the cams 93, and the latter are respectively engageable with blocks 96 secured to the plate 87 by angle members 97. The arrangement is such that rotation of the cams 93 in a clockwise direction from the position thereof shown in Figure 9 of the drawings imparts a downward thrust on the blocks 96 and causes the header assembly 86 to travel downwardly. As a result the springs 92 are compressed and the uper die section 45 is moved downwardly to emboss the top channel strip 32.

The bottom die section 46 is moved upwardly at the same time that the top die section 45 is moved downwardly, and this is accomplished by cams 98. The cams 98 are secured to a shaft 99 which extends transversely of the bottom die section 46 below the latter and is suitably journalled on the frame of the machine. It will be noted from Figure 1 of the drawings that the shaft 99 is extended for connection to a suitable source of power and is connected to the feed roll shaft 42 for operating the latter through the medium of gearing 100. The shaft 99 also has a gear 101 secured thereto, and this gear is adapted to mesh with a gear 102 secured to the cam shaft 94 for rotating the latter.

The cams 98 have suitable projections for selectively engaging the undersides of the rails 55, 56 in the manner clearly shown in Figure 5 of the drawings. It will be noted that the slide 47 is in its lowermost position in Figure 5 of the drawings, and that sufficient clearance is provided by the guides 50 to enable the upward movement of the bottom die section 46 required for the embossing projections to cooperate with the registering embossing projections on the top die section 45 to emboss the channel strips.

In order to assure uniform movement of the two die sections toward one another, linkage 102' is supported at opposite sides of the die 37. As shown in Figures 6 and 8 of the drawings, each linkage comprises a longitudinally extending link 103 having the rear end respectively pivotally connected to the blocks 84 and 88 at the rear end of the die 37 by links 104. The front end of each link 103 is respectively pivotally connected to the blocks 84 and 88 at the front end of the die by links 105. This linkage acts to prevent cocking or tilting of the two die sections 45 and 46 as the latter are moved relative to one another.

Cooperating with the linkage 102' to assure uniform movement of the top die section 45 in a downward direction are two pairs of rollers 106 and 107. The rollers 106 are spaced laterally from each other in the manner shown in Figure 2 of the drawings and are engageable with pads 108 secured to the top of the plate 87 adjacent the front end of the latter. The rollers 106 are respectively rotatably supported on the lower ends of vertically extending arms 109 by shafts 110 which extend laterally outwardly beyond the lower ends of the arms 109 through slots 111 formed in adjacent vertically extending frame members 112. Thus the rollers 106 are guided in a vertical path by the slots 111 in the frame members 112. The upper ends of the arms 109 are respectively pivotally connected to the front end of a pair of rock arms 113 shown in Figure 14 of the drawings as pivoted intermediate the ends to plates 114 which are shown in Figure 3 as respectively secured to the top edges of the frame members 112. It will also be noted from Figure 3 of the drawings that the frame members 112 and associated plates 114 are recessed to provide clearance for the cams 93. The rear swinging ends of the rock arms 113 are shown in Figure 14 as connected by a bridge member 115 and it will be noted from Figure 3 of the drawings that the undersides of the rear ends of the rock arms 113 respectively engage the cams 93. The arrangement is such that when the cams 93 are rotated in a clockwise direction to move the top die section downwardly, the rock arms 113 are swung in a corresponding direction to urge the rollers 106 in a downward direction against the pads 108 on the plate 87.

The rollers 107 respectively engage pads 116 at the rear end of the plate 87 and are moved downwardly as a unit with the rollers 106 so that substantially uniform downward pressure is applied to opposite ends of the plate 87 to assure uniform downward movement of the top die section 45. As shown in Figure 10 of the drawings, the shafts 117 on which the rollers 107 are mounted extend laterally outwardly and respectively project through slots 118 formed in the vertical frame members 112, so that the rollers 107 are also guided throughout their vertical travel. The roller shafts 117 are respectively supported on the lower ends of a pair of vertical arms 119 having the upper ends respectively pivotally connected to the rear ends of a pair of rock arms 120 similar to the rock arms 113 in that they are pivoted intermediate the ends on the plates 114. The front ends of the rock arms 120 are connected by a bridge 121 and an adjustable set screw 122 is supported on the bridge 121 for contact with the bridge 115 previously described as connecting the rear ends of the rock arms 113. The arrangement is such that the rock arms 113 operate the rock arms 120 to force the rollers 107 downwardly against the pads 116 with approximately the same force as applied to the pads 108 by the rollers 106.

In accordance with the present invention movement of the rock arms 113 and 120 by the cam 93 operates the rivet stock feeding mechanism designated generally by the reference character 123. As shown in Figures 13 and 19 the feeding mechanism 123 comprises a support 124 positioned in spaced relation above the rock arms 113 and 120. This support is movable as a unit with the die assembly 37 and is supported on the member 61 of the top die section 45 by laterally spaced vertical rods 125, shown best in Figure 7 of the drawings. Mounted on the support 124 is a plate 126 having openings 127 therethrough for respectively receiving two continuous lengths of rivet stock 128. As shown particularly in Figure 19 the inner walls of the openings 127 taper outwardly from the top surface of the plate 126 and a clutch 129 is supported in each opening. Each clutch comprises a plurality of sections 130 cooperating with one another to form a central passage for receiving a length of rivet stock 128 and having the outer walls tapered to conform to the inner walls of the opening 127. A roller 131 is rotatably supported in each clutch section and the rollers are grooved to frictionally engage the rivet stock 128 passing through the clutches 129. The peripheral portions of the rollers also ride on the tapered inner walls of the openings 127 and the arrangement is such that when the clutches are in their uppermost position with respect to the plates 126, the rivet stock 128 is gripped by the rollers. The clutch sections are urged to their stock gripping positions by coil springs 132 having the lower ends seated on brackets 133 and having the upper ends respectively engaging the sections of the two clutches. The brackets 133 are suitably supported on the plate 126 below the latter and are formed with clearance openings for the rivet stock.

It follows from the foregoing that the two lengths of rivet stock 128 are frictionally gripped by the clutches 129. However, the nature of the clutches is such that the two lengths of rivet stock 128 may be pulled downwardly relative to the clutches. In order to grip the two lengths of rivet stock for feeding the same in a downward direction, a second plate 134 is positioned directly below the plate 126. Referring again to Figure 19 of the drawings, it will be noted that the plate 134 is centrally apertured to freely receive a bolt 135 having a head at the lower end and having a threaded shank extending upwardly through the support 124 and plate 126. The threaded shank projects freely through the plate 126 and is threaded in the support 124, so that the plate 126 may be clamped to the support by nuts 136 threaded on the upper end of the bolt. It will also be noted that the plate 134 is normally urged downwardly relative to the plate 126 by coil springs 137 interposed between the plates.

The plate 134 is formed with openings 138 respectively aligned with the openings 127 in the plate 126 and having the side walls tapered in the same direction as the walls of the openings 127. Identical clutches 139 are respectively supported in the openings 138 and the rollers 140 of the clutches 139 are normally urged into gripping relationship with the rivet stock by the springs 141 which are identical to the springs 132.

In order to feed the two lengths of rivet stock in a downward direction the plate 134 is moved upwardly against the action of the springs 137. Owing to the nature of the clutches 139, upward movement of the plate 134 releases the clutches permitting relatively free upward movement of the plate 134. Although this upward movement of the plate 134 may impart an upward thrust on the two lengths of rivet stock, nevertheless, the clutches 129 prevent upward displacement of the rivet stock. As soon as the upward movement of the plate 134 is discontinued, the clutches 139 firmly grip the two lengths of stock so that the latter are advanced during downward movement of the plate 134 by the springs 137. It will be understood from the above that as soon as a downward pull is applied to the two lengths of rivet stock by the clutches 139, the clutches 129 release the stock so as not to interfere with feeding of the latter.

In the present instance the plate 134 is moved in an upward direction to initiate the rivet stock feeding action by the rock arms 120. As shown in Figures 13 and 14 of the drawings, a rail 142 extends between the plates 134 and the bridge 121 connecting the rear ends of the rock arms 120. The rear end of the rail 142 is pivoted for vertical swinging movement to the upper end of a vertical support 143 having the lower end secured to a suitable frame part 144. The arrangement is such that as the rock arms 113 and 120 are operated by the cams 93 to assist in moving the top die section 45 downwardly, the bridge 121 on the rock arms 120 engages the rail 142 to swing the latter in an upward direction. As the free end of the rail 142 swings upwardly, it engages the plate 134 and displaces the latter in an upward direction against the springs 137 to initiate the rivet stock feeding operation. As the cams 93 are advanced to permit return movement of the top die section subsequent to the embossing operation, the rock arms 113, 120 are released, enabling the rail 142 to return to its lowermost position out of contact with the plate 134. Thus the springs 137 are free to move the plate 134 downwardly and thereby advance the rivet stock.

As will be presently described the lower ends of the two lengths of rivet stock are fed into the die assembly, and it is desired to have the stock as straight as possible in order to assure properly feeding the rivet stock into the die assembly. For accomplishing this result rivet stock straightening mechanism 145 is provided. This mechanism has a slide 146 suitably supported above the rivet stock feeding mechanism 123 for vertical sliding movement. As shown in Figures 13, 20 and 21 the slide 146 comprises laterally spaced plates 147 and vertical columns 148 located between the plates. The columns 148 are channel-shaped in cross section and are reversely positioned with respect to one another in the manner shown in Figure 20 of the drawings. These columns are suitably supported at the lower ends on the machine frame and act as a guide for the slide 146. A pair of shoes 149 are respectively slidably supported in the channel-shaped columns and these shoes are respectively secured to the plates 147. The plates 147 are secured together by studs 150 which project through vertically elongated slots 151 formed in the base portions of the channels.

The two lengths of rivet stock 128 are guided from suitable coils of stock (not shown) along opposite sides of the straightening mechanism by suitable grooved rollers 152. The stock is then passed downwardly at opposite sides of the slide 146 in operative relation to straightening rollers 153. The straightening rollers 153 are arranged in two sets respectively rotatably supported on opposite sides of the slide 146. Each set of straightening rollers 153 comprises three rollers 154, 155 and 156 spaced from each other in the direction of movement of the slide. A length of rivet stock is passed over the front side of the rollers 154 and over the rear side of the intermediate roller 155 to the front side of the roller 156. It will be noted from Figure 13 of the drawings that the intermediate roller 155 of each set is positioned to lie between the rollers 153 and 156, so that the rivet stock is reversely bent to some extent as it passes over the rollers and is stretched sufficiently to straighten the same. It will be noted that the rollers 154 and 155 are rotatably supported on eccentrics 154 (Figure 20) to enable adjusting the extent of bending of the rivet stock engaged by the straightening rollers.

In order to assure effectively straightening the two lengths of rivet stock 128 the slide 146 is actually moved upwardly some time prior to feeding the lengths of stock 128 to the die assembly 37. In order to move the slide 146 in an upward direction at the desired intervals, a cam 158 is secured to the shaft 42 and is engageable with the lower end of an arm 159 shown in Figure 13 of the drawings as slidably supported on an arm 160 carried by one of the columns 148. The upper end of the arm 159 has an ear 161, and the lower end of a link 162 is pivoted to the ear 161 by a pin 163. The upper end of the link 162 is pivoted to the slide by a pin 164, so that upward displacement of the arm 159 by the cam 158 imparts a corresponding upward movement of the straightening device 145. Return or downward movement of the slide is effected by a spring 165 having the lower end connected to the arm 160 and having the upper end connected to the slide 146. Attention is called to the fact at this time that the lower end of the arm 160 is supported on a part of the machine frame in the manner clearly shown in Figure 22 of the drawings.

By reason of the straightening device 145 defined above, the portions of the rivet stock 128 between the die assembly 37 and the feeding mechanism 123 are maintained perfectly straight within practical limits. As a consequence jamming of the die assembly by irregular rivet stock is reduced to a minimum.

The feeding mechanism 123 is so arranged with respect to the die assembly 37 that the two lengths of rivet stock are located respectively adjacent opposite longitudinal edges of the structural element 30, and as shown in Figure 2 of the drawings, are spaced from each other longitudinally of the structural element. Actually the length of rivet stock 128 at one side of the structural element is adapted to register with the row of embossed portions 33 at the same side of the structural element, and the other length of rivet stock is adapted to register with the row of embossed portions 33 at the opposite side of the structural element.

As shown particularly in Figure 7 of the drawings the lower end of each length of rivet stock 128 extends downwardly through aligned openings 167 and 168 formed in the member 61 and slide 58 of the top die section 45. A bushing 169 is secured in each opening 167 and the bore through the bushing is aligned with the adjacent opening 168 in the slide 58 when the latter is in its forwardmost or inoperative position. It will be understood that the bore through each bushing 169 and the associated opening 168 are of a diameter approximating the external diameter of the rivet stock so as to snugly engage the same.

The lower ends of the two lengths of rivet stock 128 accommodated in the openings 168 are severed from the remainder of the stock by moving the slide 58 in a rearward direction against the action of the spring 64. The slide 58 is moved in a rearward direction against the action of the spring 64 to shear the lower ends of the rivet stock from the remainder thereof by cams 170 shown in Figures 5, 6 and 9 of the drawings. It will be noted from Figure 5 of the drawings that the cams 170 are secured to the shaft 94 in positions to respectively engage the cam ends 71 of the cross piece 68. The arrangement is such that the cams 170 engage the cross piece 68 at about the same time the cams 93 engage the top plate 87 on the header assembly to move the top die section 45 downwardly. In any case engagement of the cam 170 with the cross piece 68 moves the slide 58 in a rearward direction against the action of the spring 64 to cut off the lower end portions of the rivet stock 128 to form pins or rivets 35.

By the time the slide 58 approaches the end of its rearwardmost travel, the top die section 45 has been moved downwardly and the bottom die section 46 has been moved upwardly to cooperate with the top section in embossing the strips 31, 32 of the structural element 30. Referring again to Figures 6 and 9, it will be noted that when the top die section 45 is in its lowermost position, the cam ends 71 on the cross piece 68 assume positions at the rear ends of a pair of stops 173. As shown in Figure 5 of the drawings the stops 173 are respectively secured to the shoes 55 and 56. The purpose of the stops is to prevent immediate return movement of the slide 58 by the action of the spring 64 after the cross piece 68 is released by the cams 170. Actually the stops 173 cooperate with the end portions 71 of the cross piece to retain the slide 58 in its rearwardmost position until the top die section 45 is returned to its uppermost position shown in Figure 6 of the drawings.

It has previously been stated that during the embossing operation the die assembly 37 is advanced as a unit with the structural element 30. This is accomplished by the cam 44' previously described as secured to the shaft 42. The cam 44' engages the front end of a plunger 174 shown in Figure 6 of the drawings as slidably supported in the frame structure 144. The plunger is yieldably urged into contact with the cam 44' by a coil spring 175 supported between the rear end of the plunger and the bridge member 89 at the front end of the die assembly. The cam 44' is designed to impart rearward movement to the die assembly 37 at about the same time the die sections 45 and 46 are relatively moved toward each other into engagement with the structural element 30.

The rivets or pins 35 sheared from the lower ends of the stock 128 by the slide 58 are retained in the openings 168 of the slide and when the slide is in its rearwardmost position, the pins 35 register with aligned openings 177 and openings 178 in the plates 57 and parts 52 respectively. It will further be noted from Figure 7 of the drawings that the member 61 of the top die section 45 is formed with openings 179 aligned with the openings 177. The openings 179 are adapted to respectively receive punches 180 extending downwardly from the plate 87 of the header assembly 86. The purpose of the punches 180 is to engage the upper ends of the pins 35 upon continued downward movement of the header assembly and to force the pins through the strips 31, 32 of the structural element in the manner shown in Figure 10 of the drawings.

Referring now to Figure 11 of the drawings, it will be noted that the openings 177 and 178 are respectively formed in the projections 58' and 53 on the plates 57 and 52, respectively. Thus the pins 35 are forced through the embossed portions 33 of the two strips 31, 32 and the resulting slugs 181 are ejected by gravity through enlarged portions 182 of the openings 178. During this punching operation, it will be understood that the cooperating die sections 45 and 46 are in their relative closed positions wherein the slide 58 is held by the stops 173 in its rearwardmost position. However, as soon as the pins 35 are extended into the strips 31, 32 by the punches 180, the cooperating die sections are opened, permitting the slide 58 to return to its forwardmost position by the action of the spring 64. It may be pointed out at this time that vertical travel of the top die section 45 is accurately guided by pins 183 extending downwardly from the header plate 87 at longitudinally spaced points and adapted to respectively slide in bores 184 formed in the member 61. If desired the pins 183 may also be extended through the slide 58 and the plate 57 when the slide is in its rearwardmost position, in order to insure aligning the openings 168 with the lower ends of the punches 180. For this purpose the slide 58 is formed with openings 185 located to respectively register with the bores 184 in the rearwardmost position of the slide. These pins project through the slide 58 at about the same time the punches 180 are operative to perform the punching operations and the plates 57 are formed with openings 186 in alignment with the openings 184 to receive the lower ends of the guide pins 183.

After the punching operation and subsequent to separation of the die sections, the die assembly 37 is returned to its forwardmost position. This is accomplished by a cam 187 similar to the cam 44 previously described. As shown in Figures 1 and 3 of the drawings the cam 187 is secured to a drive shaft 188 located beyond the rear end of the die assembly 37 and journalled in suitable bearings 189 on the machine frame. This construction is also shown in Figure 16 of the the drawings, wherein it will be noted that a gear 190 is secured to the shaft 188 and meshes with a gear 191 which is secured to a shaft 192 journalled in the bearings 189 below the shaft 188. It will also be noted that a drive gear 193 is secured to the shaft 192 and this gear is operatively connected to the drive shaft 99 through gearing 194, shown in Figure 1 of the drawings.

The cam 187 is engageable with the outer end of a plunger 195 supported intermediate the ends in a part 196 of the machine frame for sliding movement. The rear end of the plunger 195 is yieldably urged into engagement with the cam 187 by a spring 197 located between the front end of the plunger and the bridge 89 at the rear end of the header assembly 86. The cam 187 operates in out-of-phase relationship to the cam 44 and serves to return the die assembly 37 to its forwardmost position subsequent to the punching operation.

As shown particularly in Figure 3 of the drawings a second cam 198 is secured to the shaft 188 at one side of the cam 187 and the purpose of this cam is to assist in moving the rear set of rollers 107 downwardly against the top die section. In detail a link 199 is pivoted at the rear end to a fixed support 200, and is provided with a cam follower 201 intermediate the ends for engagement with the cam 198. The front end of the link 199 is pivotally connected to the rear end of a second link 202 by a link 203. The rear end of the link 202 is shown in Figure 14 of the drawings as pivoted to a bracket 204, which in turn, is connected to a cross piece 205 extending between the rear swinging ends of the rock arms 120. A fulcrum in the form of a roller 205' is supported on the header assembly for engagement with the link 202 intermediate the ends thereof. The cam 198 operates in timed relation to the cam 93 to swing the rear ends of the rock arms 120 downwardly and thereby assist in moving the rollers 107 downwardly against the rear end of the top die section 45.

As the structural element 30 is advanced rearwardly beyond the die assembly 37, the pins or rivets 35 are peened and riveted over the respective strips 31, 32. Referring again to Figures 1 and 16 it will be noted that a pair of roll sections 207 are secured to the shaft 188 at opposite sides of the cam 187 in positions to engage the upper ends of the pin 35. It will further be noted that a roll 208 is secured to the shaft 192 directly opposite the roll sections and is provided with annular portions 209 adjacent opposite ends which cooperate with the roll sections to form serrations in the opposite ends of the pins 35 in the manner shown in Figures 25 and 26 of the drawings. As the structural element continues to advance the serrated ends of the pins 35 are peened over in the manner shown in Figure 27 of the drawings by cooperating rolls 210. These rolls are respectively mounted on shafts in positions above and below the structural element, and are driven by suitable gearing 211 shown in Figure 1 of the drawings.

As advancement of the structural element continues further, the opposite ends of the pins 35 are actually riveted over the adjacent strips 31 and 32 by a pair of riveting rolls 212. The rolls 212 are formed with a plurality of circumferentially spaced riveting heads 213. The riveting heads 213 project beyond the peripheral portions of the rolls 212 and are arranged in two series spaced axially from each other a distance determined so that one series engages the pins 35 at one side of the structural element 30 and the other series engages the pins at the opposite side of the structural element 30.

The riveting rolls 212 are driven independently of the remaining rolls and are indexed in timed relation to the rate of travel of the structural element in order to accurately register with the extremities of the pins 35. The indexing mechanism is shown in detail by Figures 17 and 18 of the drawings. This indexing mechanism comprises a ratchet wheel 215 keyed or otherwise secured to the drive shaft 192 and a second ratchet wheel 216 connected to the shaft 217 on which the riveting rolls 212 are supported. The ratchet wheels are connected by a slide bar 218 supported in any suitable manner for sliding movement on a part 219 of the machine frame. A wear plate 220 is secured to the end of the bar 218 adjacent the ratchet wheel 215 for successive engagement by the teeth on the wheel 215. A pawl 221 is pivoted to the opposite end of the bar 218 in a position to engage the teeth on the ratchet wheel 216. A coil spring 222 is provided for normally urging the bar 218 in a direction toward the ratchet wheel 215. Thus the end of the bar 218 adjacent the ratchet wheel 215 is normally positioned for successive engagement by the teeth on this wheel. The teeth on the ratchet wheel successively move the bar 218 in a direction toward the ratchet wheel 216, and the pawl 221 is advanced relative to the teeth on the ratchet wheel 216 so that as the bar is again advanced by the ratchet wheel 215, the riveting rolls 212 are indexed. The extent of angular movement of the indexing wheel 216 is determined to successively engage the riveting heads 213 on the rolls 212 with opposite ends of the pins 35. In this connection it will be noted that the ratchet wheel 216 is angularly adjustable relative to the shaft 217 in order to insure registration of the riveting heads 213 with the pins 35. As shown in Figure 18 of the drawings, the ratchet wheel 216 is actually carried by a plate 225 keyed on the shaft 217 and having an arcuate slot 226 therethrough. The ratchet wheel 216 is freely rotatably supported on the shaft 217 and has a pin 227 which extends laterally outwardly from the wheel through the slot 226. Suitable adjusting screws 228 are supported on the plate 225 and respectively project through opposite ends of the slot 226 for engagement with the pin 227. With this construction the ratchet wheel 216 may be angularly adjusted relative to the shaft 217 by merely manipulating the adjusting screws 228.

Operation

As the structural element 30 is advanced along its path of travel between the cooperating die sections 45 and 46 of the die assembly 37, the two channel strips 31, 32 are separated by the spacers 72 shown in Figures 4 and 5 of the drawings. The cooperating die sections 45 and 46 are periodically closed at regular intervals during advancement of the structural element 30 by the action of cams 93 and 98 shown in Figures 3, 6 and 9 of the drawings. At about the same time the die sections are closed, the die assembly 37 is moved with the structural element 30 at approximately the same rate of travel as the latter by the cam 44', shown in Figure 6 of the drawings. During this movement of the die assembly 37, the structural element is embossed to form the matching embossed portions 33 and 34 on the channel strips 31, 32. The embossing operation is accomplished in the region of the spacers 72 so that the strips 31, 32 are adequately supported in proper spaced relationship during the embossing operation. Also at approximately the same time the die sections 45, 46 are closed, the slide 58 is moved rearwardly against the action of the spring 64 to sever the pins or rivets 35 from the lengths of rivet stock 128 which have previously been fed through the bushings 169 and registering openings 168, shown in Figure 7 of the drawings. The slide 58 is moved rearwardly by the cams 170 before the cooperating die sections 45 and 46 are completely closed. The arrangement is such that when the die sections are completely closed, the free ends 71 of the cross piece 68 assume positions in rear of the stops 173 (Figure 6) to prevent immediate return movement of the slide 58 by the spring 64.

After the die sections are closed, the top header assembly 86 continues to move downwardly to engage the guide pins 183 in the aligned holes 185 and 186 to thereby accurately locate the slide 58 in a position wherein the pins 35 are aligned with the punches 180. As a result continued downward movement of the header assembley 86 forces the pins 35 through the embossed portions 33 of the channel strips 31, 32.

The header assembly 86 is then returned to its uppermost position and the cooperating die sections are relatively moved to their open positions where the ends 71 on the cross piece 68 are released from the stops 173 permitting the spring 64 to return the slide 58 to a position wherein the openings 168 in the slide again register with the bushings 169. At about the same time the slide 58 is moved rearwardly, or in other words, as the die sections 45 and 46 are opened, the lengths of rivet stock 128 are fed downwardly by the mechanism 123 in Figure 13 of the drawings to again project the lower ends of the rivet stock into the openings 168. In this connection it will be understood that during the interval the cams 93 operate to move the top die section 45 downwardly, the clutches 139 of the feed mechanism 123 are moved upwardly to grip the two lengths of rivet stock, so that when the cams 93 release the top die section, the clutches 139 are returned to their normal positions shown in Figure 19 of the drawings to effect the feeding operation. It will also be understood from the foregoing description that the lengths of rivet stock 128 are straightened periodically by the mechanism 145 which is actuated by the cam 158 shown in Figure 13 of the drawings.

As the stock advances beyond the rear end of the die assembly 37, it is successively introduced to the rolls 207, 210 and 212. The rolls 207 form serrations in the opposite ends of the pins 35 in the manner shown in Figures 25 and 26 of the drawings. The rolls 210 peen the serrated portions of the pins over as shown in Figure 27 of the drawings, and the rolls 212 are indexed to rivet the peened ends of the pins rigidly against the adjacent strips of the structural element. Thus the two strips of the structural element are firmly secured together in spaced relationship, and may be used to effectively retain nails in building structure, if desired.

What I claim as my invention is:

1. Apparatus for securing strips together comprising a pair of die sections supported for relative movement toward and away from each other, means for advancing a pair of strips in juxtaposition between the die sections, means for relatively moving the die sections in directions toward one another, means for moving the die sections as a unit with the strips in response to relative movement of the die sections toward one another, spacers carried by one of the die sections and positioned to extend between the strips for spacing one strip from the other, embossing projections carried by the die sections adapted to project through slots in the spacers upon relative movement of the die sections to their closed positions for embossing said strips, and means for forcing pins through the strips at the embossed portions in response to relative movement of the die sections toward one another and while the die sections are advanced with the strips.

2. Apparatus for securing strips together comprising a pair of die sections supported for relative movement toward and away from each other, means for advancing a pair of strips in juxtaposition between the die sections, means for relatively moving the die sections in directions toward one another, means for moving the die sections as a unit with the strips in response to relative movement of the die sections toward one another, spacers carried by one of the die sections and positioned to extend between the strips for spacing one strip from the other, embossing projections carried by the die sections adapted to project through slots in the spacers upon relative movement of the die sections to their closed positions for embossing said strips, and means for punching openings through the embossed portions of the strips in response to relative movement of the die sections toward one another.

3. Apparatus for securing strips together comprising a pair of die sections supported for relative movement toward and away from each other, means for advancing a pair of strips in juxtaposition between the die sections, a cam supported for rotation and rotated by said advancing means, said cam being positioned to engage one die section for moving the latter toward the other die section during advancement of the strips, and means operated by said cam for feeding rivet stock to the said one die section.

4. Apparatus for securing strips together comprising a pair of die sections supported for relative movement toward and away from each other, means for advancing a pair of strips in juxtaposition between the die sections, a cam supported for rotation and rotated by said advancing means, said cam being positioned to engage one die section for moving the latter toward the other die section during advancement of the strips, means operated by said cam for feeding rivet stock to the said one die section, and means operated by said advancing means for periodically moving the die sections and rivet feeding means as a unit with the strips.

5. Apparatus for securing strips together comprising a pair of die sections supported for relative movement toward and away from each other, means for advancing a pair of strips in juxaposition between the die sections, a cam supported for rotation and rotated by said advancing means, said cam being positioned to engage one of the die sections intermediate the ends thereof to move the latter toward the other die section during advancement of the strips, pressure applying elements engageable with opposite ends of the said one die section adjacent opposite sides thereof, means operated by the cam for urging the elements against the said one die section to assist in moving the latter toward the other die section, and means also operated by said cam for feeding a length of rivet stock to one of the die sections.

6. Apparatus for securing strips together comprising a pair of die sections supported for relative movement toward and away from each other, means for advancing a pair of strips in juxtaposition between the die sections, means for relatively moving the die sections in directions toward one another, means for moving the die sections as a unit with the strips in response to relative movement of the die sections toward one another, spacers carried by one of the die sections and positioned to extend between the strips for spacing one strip from the other, embossing projections carried by the die sections adapted to engage and emboss said strips in the region of said spacers upon relative movement of said die sections to their closed positions, and means for forcing pins through said strips at the embossed portions in response to relative movement of said die sections toward one another and while said die sections are advanced with said strips.

7. Apparatus for securing strips together comprising a pair of die sections supported for relative movement toward and away from each other, means for advancing a pair of strips in juxaposition between the die sections, means for relatively moving the die sections in directions toward one another, means for moving the die sections as a unit with the strips in response to relative movement of the die sections toward one another, spacers carried by one of the die sections and positioned to extend between the strips for spacing one strip from the other, embossing projections carried by the die sections adapted to engage and emboss said strips in the region of said spacers upon relative movement of said die sections to their closed positions, and means for securing the strips together at the embossed portions in response to relative movement of the die sections toward one another and as said strips continue to move along their path of travel.

8. Apparatus for securing strips together comprising means for advancing the strips in juxtaposition along a predetermined path of travel, a spacer positioned in the path of travel of the strips and adapted to project between the strips to space one from the other, embossing means movable through slots in said spacers and into engagement with one strip while the strips are advanced to emboss said one strip toward the other, means for moving said embossing means as a unit with the strips in response to movement of said embossing means toward said one strip, and means for forcing pins through the strips at the embossed portions in response to movement of said embossing means toward said one strip and while said embossing means is advanced with the strips.

9. Apparatus for securing strips together comprising means for advancing the strips in juxtaposition along a predetermined path of travel, a spacer positioned in the path of travel of the strips and adapted to project between the strips to space one from the other, embossing means movable toward and into engagement with one strip in the region of said spacer while the strips are advanced to emboss said one strip toward the other, means for moving said embossing means as a unit with the strips in response to movement of said embossing means toward said one strip, and means for forcing pins through the strips at the embossed portions in response to movement of said embossing means toward said one strip and while said embossing means is advanced with the strips.

10. Apparatus for securing strips together comprising means for advancing the strips in juxtaposition along a predetermined path of travel, a spacer positioned in the path of travel of the strips and adapted to project between the strips to space one from the other, embossing means movable toward and into engagement with one strip in the region of said spacer while the strips are advanced to emboss said one strip toward the other, means for moving said embossing means as a unit with the strips during the embossing operations, and means for forcing pins through the strips at the embossed portions in response to movement of said embossing means toward said one strip and while said embossing means is advanced with the strips.

11. Apparatus for securing strips together comprising means for advancing first and second strips in juxtaposition along a predetermined path of travel, a spacer supported in the path of travel of the strips in a position to project between said strips to space one from the other, means for periodically embossing the first strip in a direction toward the second strip as said strips are advanced along the path of travel, said embossing means including a plate supported to one side of the first strip for movement in directions toward and away from the first strip and having an embossing projection positioned to engage the first strip in the region of the spacer, means operated by said advancing means for moving said plate toward said first strip, means operated by said advancing means for securing the strips together at the embossed portions during advancement of the strips, and means operated by said advancing means for moving the spacer and plate as a unit with the strips during the embossing operations and also for moving said securing means as a unit with the strips during the securing operations.

12. Apparatus for securing strips together comprising means for advancing the strips in juxtaposition along a predetermined path of travel, means supported to one side of the path of travel and operated by said advancing means for periodically advancing pins in the same direction and at approximately the same rate as the strips, means operated by said advancing means for forcing the pins through the strips during movement of the pins with said strips, means for riveting the ends of the pins over the adjacent strips including rolls supported at opposite sides of the strips and having circumferentially spaced riveting heads, and means operated by said advancing means for periodically rotating the rolls to successively engage the riveting heads with said pins during advancement of the strips.

13. Apparatus for securing strips together comprising means for advancing first and second strips in juxtaposition along a predetermined path of travel, a spacer supported in the path of travel of the strips in a position to project between the strips and space one strip from the other, means for periodically embossing the first strip in a direction toward the second strip including a plate supported to one side of the first strip for movement toward and away from said first strip and having an embossing projection positioned to engage the first strip in the region of said spacer while the strips are advanced along said path of travel, means operated by said advancing means for moving said plate toward the first strip, means operated by said advancing means for forcing pins through the strips at the embossed portions during advancement of the strips, and means operated by said advancing means for moving the plate and spacer as a unit with the strips during the embossing operations and also for moving said forcing means as a unit with the strips during the time that the pins are forced through the strips.

14. The apparatus defined in claim 13 having means operated by said advancing means for riveting the ends of the pins over the strips during continued advancement of the strips along said path of travel.

15. Apparatus for securing strips together comprising means for advancing first and second strips in juxtaposition along a predetermined path of travel, a spacer supported in the path of travel of the strips in a position to project between said strips to space one from the other, embossing means movable toward the first strip and having an embossing projection engageable with the first strip in the region of said spacer while the strips are advanced to emboss the first strip toward the second strip, means operated by said advancing means for moving said embossing means toward the first strip, means for securing the strips together at the embossed portions in response to movement of said embossing means toward the first strip and during advancement of the strips, and means operated by said advancing means for moving said spacer and embossing means as a unit with the strips during the embossing operations and also for moving said securing means as a unit with the strips during the securing operations.

References Cited in the file of this patent

UNITED STATES PATENTS

| Number | Name | Date |
|---|---|---|
| 507,263 | Egge | Oct. 24, 1893 |
| 588,236 | Noyes | Aug. 17, 1897 |
| 1,968,442 | Clark et al. | July 31, 1934 |
| 2,069,042 | Marchant | Jan. 26, 1937 |
| 2,156,323 | Tishken | May 2, 1939 |
| 2,216,403 | Oeckl et al. | Oct. 1, 1940 |
| 2,301,236 | Yoder | Nov. 10, 1942 |
| 2,328,821 | Lyon | Sept. 7, 1943 |
| 2,328,919 | Merriman | Sept. 7, 1943 |
| 2,356,526 | Mayer et al. | Aug. 22, 1944 |
| 2,363,972 | Kellogg | Nov. 28, 1944 |
| 2,455,903 | Fischer | Dec. 7, 1948 |
| 2,473,590 | Kellogg | June 21, 1949 |
| 2,562,475 | Penkala | July 31, 1951 |